May 17, 1960   R. E. HARRINGTON ET AL   2,936,818
SEAT STRUCTURE

Filed April 8, 1957   2 Sheets-Sheet 1

INVENTORS
R. E. Harrington &
B. M. Silverberg

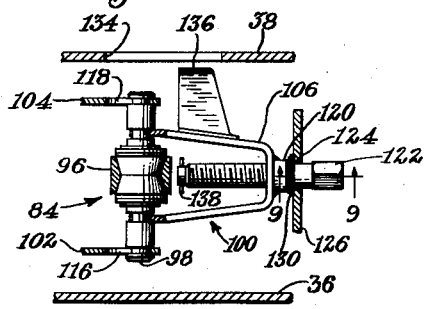
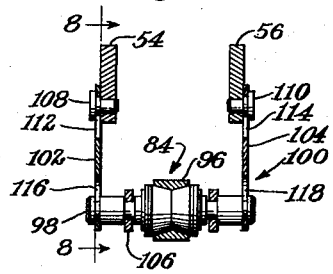
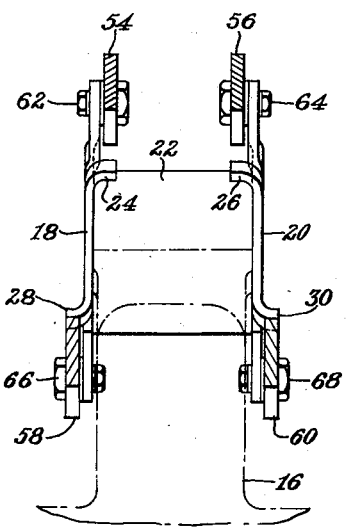
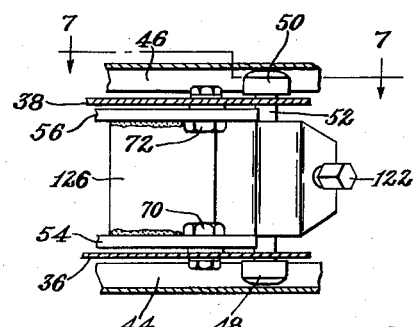
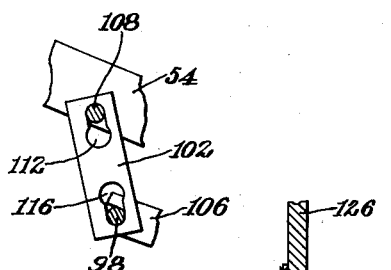
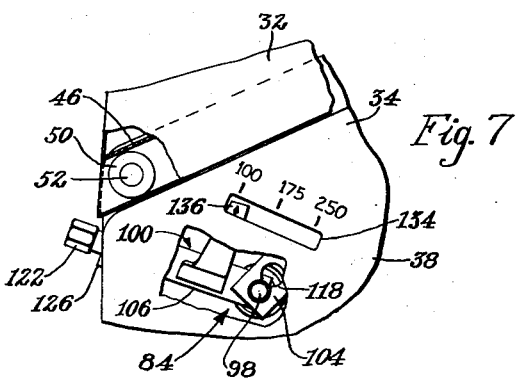
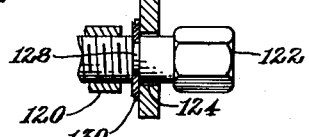

United States Patent Office 2,936,818
Patented May 17, 1960

2,936,818

SEAT STRUCTURE

Roy E. Harrington, Moline, Ill., and Bernard M. Silverberg, Milwaukee, Wis., assignors, by mesne assignments, to Deere & Company, a corporation of Delaware Application April 8, 1957, Serial No. 651,238

13 Claims. (Cl. 155—51)

This invention relates to a seat and more particularly to an improved seat suspension for mounting a seat on a vehicle such as an agricultural tractor or machine. Still more particularly, the invention pertains to an improved adjustable suspension comprising an improvement on the design forming the subject matter of assignee's copending application Serial No. 420,283 filed April 1, 1954, now Patent No. 2,840,140.

As will be appreciated by those skilled in the art, and as pointed out in said patent, the problems of comfort and improved riding qualities are more acute in a vehicle seat than in a static seat, and these problems are accentuated in the agricultural field because of the uneven terrain over which agricultural vehicles operate. In the typical parallel link suspension means for seats of this type, some provision will be made for adjustment of the components in order that the seat may accommodate riders of different weights, heights and other physical characteristics. The weight characteristic may be accommodated by varying the pre-load on the suspension spring, or the moment arm of the lever acting on the spring may be adjusted. However, independent adjustment of either of these factors is undesirable, or at least does not give the best results. According to the patent referred to, the advantages of both types of adjustment are advantageously employed, preferably by utilizing a single adjusting member to adjust the length of the moment arm and the pre-load on the spring in direct proportion.

It is a primary object of the present invention to improve the suspension, particularly in the mounting of the suspension spring and the adjustment for the pre-load and moment arm respecting the same. The invention features a novel adjustment comprising a swingable link mounted on one of the suspension links and movable in a fore-and-aft path having such relationship to the suspension link and biasing means as to increase the moment arm and to simultaneously increase the pre-load, or vice versa. A further object of the invention resides in improved means for facilitating the adjustment and for ascertaining the adjustment exteriorly of the seat structure.

The foregoing and other important objects and desirable features inherent in and encompassed by the invention will become apparent as a preferred embodiment thereof is disclosed in detail in the ensuing specification and accompanying drawings, the several figures of which are described immediately below.

Fig. 3 is a section on the line 3—3 of Fig. 1.

Fig. 4 is a section on the line 4—4 of Fig. 2.

Fig. 5 is a section on the line 5—5 of Fig. 1.

Fig. 6 is a section on the line 6—6 of Fig. 1.

Fig. 7 is an elevation of a portion of the seat as seen from the side opposite to that shown in Figs. 1 and 2.

Fig. 8 is a section on the line 8—8 of Fig. 4.

Fig. 9 is an enlarged section on the line 9—9 of Fig. 3.

Figure 1:
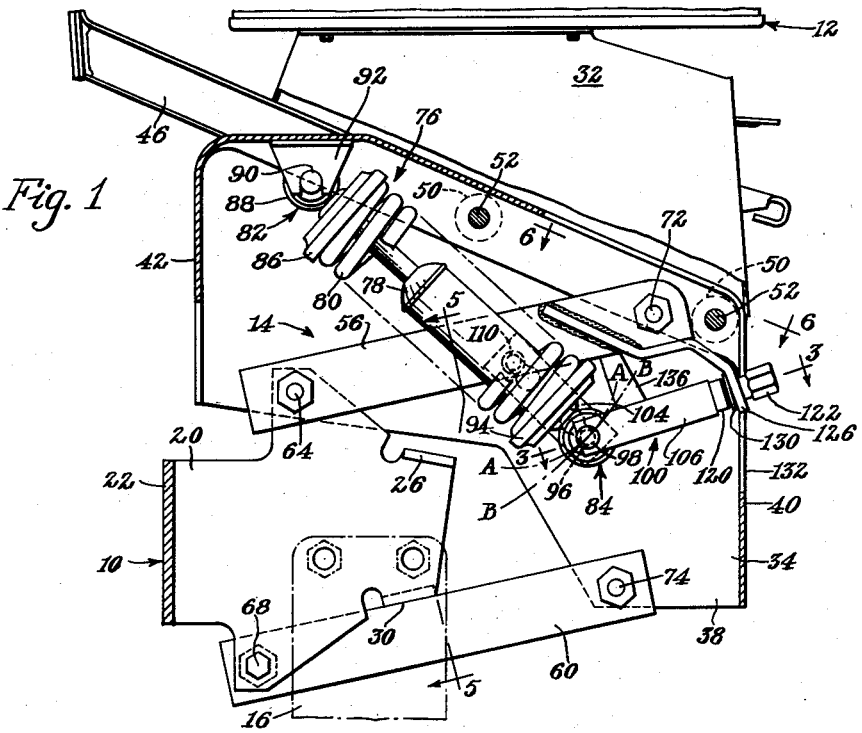
Fig. 1 is a side view, partly in longitudinal section, of the seat in its maximum upward position.

The seat structure comprises a support element 10 and a seat element 12, interconnected by parallel link suspension means 14. The support is shown as being mounted on a rear portion 16 of a tractor or similar vehicle, the details of which are not material. The support has opposite force-and-aft sides 18 and 20 and a transverse rear connecting wall 22, the support being a plate-like element to establish the configuration just described. Upper marginal portions of the sides 18 and 20 are turned inwardly to afford lugs or stops 24 and 26 respectively. Lower stops 28 and 30, respectively, are established on the sides 18 and 20 by outwardly turned lug portions as best seen in Fig. 5.

The seat includes upper and lower portions 32 and 34, the latter being mounted directly on the suspension means 14 and the former being mounted on the latter for relative fore-and-aft and uphill and downhill adjustment. Since the adjustment is not material here, the two portions 32 and 34 may be considered as one. So considered, the seat element has depending wall structure made up of right and left hand fore-and-aft extending side walls 36 and 38, a transverse front wall 40 and a rear wall 42. This wall structure embraces or encloses the suspension 14, allowing sufficient clearance for adequate operation of the suspension means but at the same time affording at least a protective enclosure which also improves the appearance of the seat structure. The general nature of the means by which the upper portion 32 of the seat may be adjusted fore-and-aft relative to the lower portion 34 may be gathered primarily from Fig. 6, in which it is shown that this adjustment includes fore-and-aft track means 44 and 46 respectively at opposite sides of the structure and including rollers 48 and 50 mounted on front and rear cross shafts 52. As already indicated, the specific nature of the track means is not material but has been described to the foregoing extent because the illustration thereof is involved in the illustration of the material parts of the invention.

The suspension means 14 is typical of the well-known parallel link suspension, but this characteristic does not limit the invention, the parallel link suspension being shown because of its popularity and adaptability to the present improvement. The suspension includes right and left hand upper links 54 and 56 and right and left hand lower links 58 and 60. The right hand upper link 54 is mounted on an upper right hand portion of the support 10 by a transverse pivot 62, which is coaxial with a similar pivot 64 for mounting the upper link 56. Similarly coaxial lower pivots are established by right and left hand rear lower pivot members 66 and 68 for the lower links 58 and 60 respectively. The links extend forwardly from the respective pivots and have their front ends pivoted to the seat by right and left hand coaxial upper pivots 70 and 72 and right and left hand lower pivots, only the left hand one of which appears at 74 but the presence of the right hand one of which will be readily apparent. The suspension means thus mounts the seat element 12 on the support element 10 for generally up and down movement of the former relative to the latter, which movement follows substantially a vertical path as is common to parallel link suspensions. The maximum upward position of the seat (Fig. 1) is established by the one-way stop comprising the previously described lugs 28 and 30 when engaged respectively by the top edges of the lower links 58 and 60 (Fig. 5). The maximum down position of the seat (Fig. 2) is established by the stop effect obtained between engagement of the lower edges of the top links 54 and 56 with the inturned support lugs 24 and 26. The seat has of course an infinite number of intermediate positions and the control of the seat through the up and down positions is established by biased means indicated in its entirety by the numeral 76. This means may take the form of a conventional spring and shock absorbing unit comprising a shock absorber 78 encircled by a coiled compression spring 80, the axis of which inclines forwardly and downwardly from a rear or upper connecting portion 82 to a lower or front connecting portion 84. The upper connecting portion is established by a cap 86, an eye 88 on the unit 76 and a cross pin 90 which is received in a downwardly slotted lug 92 mounted on the seat wall structure at a point generally above the rear pivot axis 62—64 for the suspension links. The spring 80 abuts the cap 86 at one end and at its other end abuts a second cap 94 which, together with an eye 96 and cross pin 98, comprises the lower connecting portion 84.

The connecting portion 84 is mounted on the links 54 and 56 by hanger means 100 which comprises a pair of depending links 102 and 104 and a fore-and-aft adjustable member in the form of a yoke 106. The depending links 102 and 104 are respectively pivotally connected at their upper ends at 108 and 110 to the upper suspension links 54 and 56 on a coaxial transverse axis intermediate the front and rear pivots of the suspension links, and the lower ends of the depending links are connected to the cross pin 98 of the lower connecting portion 84 of the biased unit 76 (Fig. 4). The connection of the upper end of the right hand depending link 102 at 108 is effected by a keyhole slot 112 in the link which receives the pin 108, which is grooved. A similar connection for the upper end of the other link 104 is effected at 114 (Fig. 4). Similar keyhole slots 116 and 118 are provided respectively in the lower portions of the depending links 102 and 104 for receipt by opposite grooved ends of the transverse connecting pin 98 (Figs. 4 and 8). This type of connection permits of ready assembly and disassembly, but inadvertent disconnection during operation cannot occur, because, as will be readily apparent, the pressure of the spring 80 tends to maintain the connection.

The yoke 108—106 has its legs pivotally connected to the connecting pin 98 and at its closed end has welded thereto a nut 120 in which is carried a threaded adjusting member 122. This adjusting member passes through an aperture 124 in a front support in the form of a plate 126 which is positioned transversely between and is welded at opposite edges to the forward portions of the top suspension links 54 and 56. As best shown in Fig. 9, the adjusting member has an annular groove 128 which receives a retaining ring 130 confined between the back of the front portion of the plate 126 and the front of the nut 120 on the yoke 106. Hence, as the threaded member 122 is turned in one direction or the other, it propels and repels the yoke 106 and since the yoke is connected to the depending links 102 and 104, these links are swung in unison about an arc A—A, which intersects an arc B—B about the axis of the pin 90, the purpose of which will be explained below. (See Fig. 1.)

Figure 2:
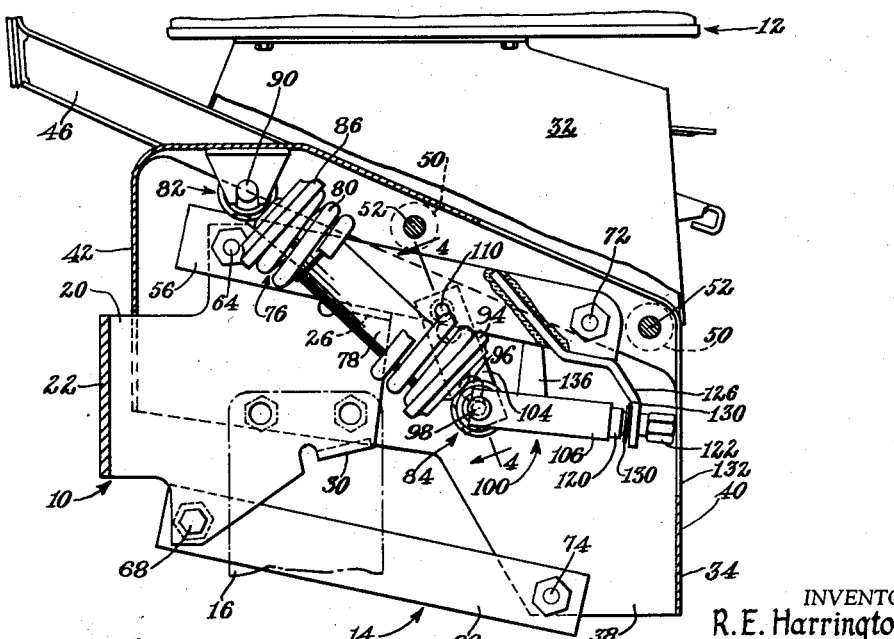
Fig. 2 is a similar view showing the seat in its maximum down position.

The front wall 40 of the seat structure is appropriately apertured at 132 to provide access to the threaded member 122 and also to provide clearance for movement of this member as the seat changes position as between Figs. 1 and 2. The side wall 38 of the seat is apertured at 134 to provide visible access to an indicator 136 mounted on the yoke 106 (Figs. 3 and 7). When the yoke 106 is adjusted fore-and-aft by the adjusting member 102, the indicator 136 of course moves fore-and-aft along the aperture 134. The wall portion adjacent to the aperture is appropriately marked with indicia (Fig. 7), here in term of pounds representing various adjustments according to various weights of riders.

Operation

The seat is biased toward its maximum upward position (Fig. 1) by the biased means or unit 76 and, when the seat is unoccupied, it will be stopped in its maximum upward position by the stops at 28—58 and 30—60 (Fig. 5). The action of the unit 76 may best be considered by noting that the adjustable hanger means 100, when fixed in an adjusted position, establishes a triangular support having three apices, one at the connection of the pending links 102 and 104 to the upper suspension links 54 and 56 at 108 and 110, a second at the connecting pin 98, and a third at the abutment of the retainer ring 130 on the threaded member 122 with the front portion of the support plate 126. Thus, in effect, the biased means acts between the upper connecting portion 82 and a forward portion of the upper suspension links 54 and 56, thus yieldingly opposing downward movement of the seat. The combined action of the spring and shock absorber as such is well-known and need not be elaborated. In this system, the moment arm of the upper suspension links against which the units 76 acts is represented by the distance measured along a line drawn through the pivot axis 70—72 and perpendicular to a line through 90—98, and it will be seen that as the connecting pin is moved forwardly, by adjustment of the threaded member 122, the moment arm will decrease in length, because the connecting pin, following the arc A—A, approaches the pivot axis 70—72. The converse is true when the connecting pin is moved rearwardly along the arc A—A. The maximum forward position is shown in the drawings, Fig. 7 illustrating that the indicator 136 is at the "one hundred pound" mark, thus the adjustment being set for a relatively light operator or rider.

As previously described, the arc B—B is drawn about the upper pivot connection 90 of the unit 76 to the seat via the bracket or lug 92 and, as depicted in Fig. 1, rearward adjustment of the connecting pin 98, following the arc A—A, compels the unit 76 to shorten, since the path of travel (arc A—A) of the pin 98 is fixed by the length of the depending links 102 and 104. Since the unit 76 shortens, the spring 80 is compressed and this has the effect of increasing the pre-load on the spring. The maximum rearward position of the hanger means 100 is determined when a stop pin 138 (Fig. 3) engages the rear part of the closed end of the yoke 106. The limit of travel for the maximum forward position of the hanger means is determined when the snap ring 130 engages the nut 120 on the yoke, as shown in Fig. 3.

The adjustment is most easily effected when the seat is stopped in its maximum upward position (Fig. 3), thus confining the spring so that the pre-load thereon may be adjusted simultaneously with adjustment of the moment arm against which the spring acts. Of significance here is the fact that as the moment arm is increased, the preload on the spring is simultaneously increased, and vice versa. Thus, adjustment of the moment arm and pre-load not only occurs simultaneously but also occurs in direct proportion, and the person making the adjustment can readily gauge the proper adjustment by knowledge of his own weight and then setting the adjustment according thereto by the indicating means as shown in Fig. 7.

The advantages of the simultaneous adjustment of moment arm and pre-load in the manner described are adequately set forth in the patent identified above and need not be elaborated here. However, the present invention is important from the standpoint of contributing a simple and novel means by which this adjustment may be effected, the hanger means 100 representing a preferred embodiment that accomplishes the desired results. The provision of the keyhole slots in the depending links enables ready assembly and disassembly and, as pointed out, assembly during operation is retained because of the pressure of the spring 80. The threaded adjusting member 122 may be readily adjusted by a wrench or other appropriate tool. The entire suspension is appropriately enclosed by the wall means on the seat, yet adequate provision is made for access to the adjusting member 122 and for visible access to the indicating means as seen in Fig. 7.

Features of the invention not categorically enumerated herein will undoubtedly occur to those versed in the art, as will many modifications and alterations in the preferred embodiment disclosed, all of which may be achieved without departure from the spirit and scope of the invention.

What is claimed is:

1. In a seat structure having a seat and a seat support, the improvement residing in suspension means for the seat, comprising: upper and lower fore-and-aft suspension links having transverse rear pivots to the support and transverse front pivots to the seat and mounting the seat for up and down movement relative to the support; a depending link having an upper transverse pivot to the upper link intermediate the front and rear pivots of said upper link and depending to a lower end for swinging in a fore-and-aft arc about said upper pivot; adjustable means connected between the depending link and the upper link for selectively positioning the lower end of said depending link along said arc; and biasing means connected at one end to the depending link below the depending link upper pivot and extending upwardly and rearwardly and having its other end connected to the seat and operative to urge the seat upwardly and to resiliently oppose downward movement of said seat.

2. In a seat structure having a seat and a seat support, the improvement residing in suspension means for the seat, comprising: upper and lower fore-and-aft suspension links having transverse rear pivots to the support and transverse front pivots to the seat and mounting the seat for up and down movement relative to the support; a depending link having an upper transverse pivot to one suspension link intermediate the front and rear pivots of said one suspension link and depending to a lower end for swinging in a fore-and-aft arc about said upper pivot; adjustable means connected between the depending link and said one suspension link for selectively positioning the lower end of said depending link along said arc; and biasing means connected at one end to the depending link below the depending link upper pivot and extending upwardly and rearwardly and having its other end connected to the seat and operative to urge the seat upwardly and to resiliently oppose downward movement of said seat.

3. In a seat structure having a seat and a seat support, improvement residing in suspension means for the seat, comprising: upper and lower fore-and-aft suspension links having transverse rear pivots to the support and transverse front pivots to the seat and mounting the seat for up and down movement relative to the support; a depending link having an upper transverse pivot to one suspension link intermediate the front and rear pivots of said one suspension link and depending to a lower end for swinging in a fore-and-aft arc about said upper pivot; adjustable means connected between the depending link and said one suspension link for selectively positioning the lower end of said depending link along said arc; one-way stop means operative to limit upward movement of the seat; and biasing means connected at one end to the depending link below the depending link upper pivot and having its other end pivoted to the seat at a point upwardly and rearwardly of the depending link pivot.

4. The invention defined in claim 3, in which: the stop means includes a plate-like member on the support and having a lug projecting into the path of upward movement of one of the suspension links.

5. The invention defined in claim 4, including: a second stop means comprising an additional lug on said member and projecting into the downward path of one of the suspension links to limit downward movement of the seat.

6. In a seat structure having a seat and a seat support, the improvement residing in suspension means mounting the seat on and for vertical movement relative to the support, comprising: a lever having a first pivot to the support and a second pivot to the seat for moving when the seat moves vertically relative to the support; one-way stop means limiting upward movement of the seat to a maximum upward position; a first connection on the seat in spaced relation to the second pivot; a second connection on the lever intermediate the first and second pivots and forming the third apex of a triangle of which the first connection and the second pivot form the other two apices; pre-loaded biased means connected between the first and second connections as a variable-length side of said triangle and acting on the moment arm between the second connection and the second pivot to urge the seat to its maximum upward position; means mounting the second connection on said lever for movement selectively toward and away from the second pivot to vary the length of said moment arm and for simultaneously varying the distance between the first and second connections so as to vary the pre-load on the biased means in direct proportion to the length of said moment arm while the seat is in its maximum upward position; and means for adjusting and fixing any selected position of said second connection mounting means.

7. A seat structure, comprising: a support having opposite fore-and-aft sides; a seat disposed above the support; suspension linkage mounting the seat on and for movement vertically relative to the support and including a pair of fore-and-aft suspension links having transversely coaxial rear pivots to the support and transversely coaxial front pivots to the seat, one link being located at each side of the support; a biasing unit arranged laterally intermediate the links and having an upper end connected to the seat above the rear pivot and inclining downwardly and forwardly to a lower end rearwardly of and below the front pivot; hanger means having a pivot on a transverse axis to one pair of links above said lower end of the biasing unit and rearwardly of the front pivots of and depending from said one pair of links and connected to said lower end of the biasing unit for fore-and-aft adjustment through an arc about said hanger means pivot; one-way stop means limiting upward movement of the seat; and means for adjusting the hanger means fore-and-aft and for fixing a selected position of said hanger means.

8. The invention defined in claim 7, in which: the seat includes opposite fore-and-aft side walls depending therefrom respectively outwardly of the links, one of said walls having an aperture therethrough in the vicinity of the hanger means and through which the adjusted position of the hanger means may be visibly ascertained from exteriorly of said one wall.

9. The invention defined in claim 8, including: indicating means connected to and reflecting the position of the hanger means and projecting into proximity to said aperture; and indicia on the one wall adjacent to said aperture for cooperation with said indicating means.

10. A seat structure, comprising: a support having opposite fore-and-aft sides; a seat disposed above the support; fore-and-aft suspension linkage mounting the seat on and for movement vertically relative to the support and having a transverse rear pivot to the support and a transverse front pivot to the seat; a biasing unit having an upper end connected to the seat above the rear pivot and inclining downwardly and forwardly to a lower end rearwardly of and below the front pivot; hanger means having a pivot on a transverse axis to the linkage above said lower end of the biasing unit and rearwardly of said front pivot and depending from said linkage and connected to said lower end of the biasing unit for fore-and-aft adjustment through an arc about said hanger means pivot; one-way stop means limiting upward movement of the seat; and means for adjusting the hanger means fore-and-aft and for fixing a selected position of said hanger means.

11. A seat structure, comprising: a support having opposite fore-and-aft sides; a seat disposed above the support; fore-and-aft suspension linkage mounting the seat on and for movement vertically relative to the support and having a transverse rear pivot to the support and a transverse front pivot to the seat; a biasing unit having an upper end connected to the seat above the rear pivot and inclining downwardly and forwardly to a lower end rearwardly of and below the front pivot; means adjustable fore-and-aft on the linkage and connected to the lower end of the unit; one-way stop means limiting upward movement of the seat; means for adjusting the adjustable means fore-and-aft and for fixing a selected adjusted position thereof; means on the seat including a side wall depending adjacent to and outwardly of the linkage and having an aperture therethrough in the vicinity of the adjustable means and through which the adjusted position of the adjustable means may be visibly ascertained from exteriorly of said wall.

12. In a seat structure having a seat and a seat support, the improvement residing in suspension means for the seat, comprising: upper and lower fore-and-aft suspension links having transverse rear pivots to the support and transverse front pivots to the seat and mounting the seat for up and down movement relative to the support; one-way stop means for limiting upward movement of the seat; variable-load biasing means having an upper force-transmitting connection to the seat rearwardly and upwardly of the front pivot of one suspension link and operative along a line of force extending downwardly and forwardly to a lower force-transmitting element adjacent to but spaced from said front pivot; and anchor means connecting said lower force-transmitting connection to said one suspension link for effectuating the biasing means to exert an upward force on the seat and a downward force on the anchor means, said biasing means being preloaded to urge the seat upwardly to the limit of said stop means, and said anchor means being adjustable, with the seat upwardly limited by said stop means, for selectively changing the distance of said lower force-transmitting element from both said front pivot and said upper force-transmitting connection in such manner as to simultaneously vary the pre-load on the biasing means in direct proportion to the length of the moment arm between said front pivot and said element.

13. The invention defined in claim 1, in which: the biasing means is connected to the depending link by a pivot pin and said depending link has a keyhole slot therein at its lower end detachably receiving said pin, and said depending link has a further keyhole slot therein at its upper end detachably receiving said upper pivot.

References Cited in the file of this patent

UNITED STATES PATENTS

| | | |
|---|---|---|
| 2,432,554 | Knoedler | Dec. 16, 1947 |
| 2,663,355 | Harms | Dec. 22, 1953 |
| 2,719,711 | Nallinger | Oct. 4, 1955 |
| 2,783,822 | Hickman | Mar. 5, 1957 |

FOREIGN PATENTS

| | | |
|---|---|---|
| 15,381 | Great Britain | 1890 |
| 627,452 | Great Britain | Aug. 9, 1949 |
| 833,455 | Germany | Mar. 10, 1952 |
| 859,565 | Germany | Dec. 15, 1952 |
| 1,133,986 | France | Nov. 26, 1956 |